United States Patent [19]

Huber et al.

[11] Patent Number: 5,056,648
[45] Date of Patent: Oct. 15, 1991

[54] PUSH CUT DEVICE

[75] Inventors: Robert Huber, Wettingen; Vladimir Vajda, Nussbaumen, both of Switzerland

[73] Assignee: Emhart Glass Machinery Inc., Windsor, Conn.

[21] Appl. No.: 675,308

[22] Filed: Mar. 26, 1991

[30] Foreign Application Priority Data

Apr. 6, 1990 [GB] United Kingdom ............. 9007853

[51] Int. Cl.⁵ .................................... B65G 25/00
[52] U.S. Cl. ........................... 198/468.01; 198/740; 65/260
[58] Field of Search .............. 198/419.1, 426, 430, 198/468.01, 458, 740; 65/239, 241, 260

[56] References Cited

U.S. PATENT DOCUMENTS

| | | |
|---|---|---|
| 3,249,201 | 5/1966 | Rydlewicz ............... 198/468.01 |
| 3,318,433 | 5/1967 | Rowe ....................... 198/468.01 |
| 3,400,802 | 9/1968 | Rowe ....................... 198/468.01 |
| 3,595,365 | 7/1971 | Favre ....................... 198/468.01 |
| 3,679,041 | 7/1972 | Parkell ..................... 198/468.01 |
| 3,764,284 | 10/1973 | Rowe ........................ 65/260 X |
| 3,779,362 | 12/1973 | Horn ..................... 198/468.01 X |
| 4,203,752 | 5/1980 | Becker et al. ............. 198/740 X |
| 4,340,413 | 7/1982 | Rowland ............... 198/468.01 X |
| 4,462,519 | 7/1984 | Parkell et al. ............ 198/740 X |
| 4,771,878 | 9/1988 | Braithwaite et al. ....... 198/468.01 |

Primary Examiner—Joseph E. Valenza
Assistant Examiner—James R. Bidwell
Attorney, Agent, or Firm—Spencer T. Smith

[57] ABSTRACT

The fingers (20,22,24) of a push out device are constructed so that the spacing between then is adjustable between that appropriate to the spacing of containers on the dead plate (4) to that appropriate to a desired spacing of the containers on a conveyor.

4 Claims, 2 Drawing Sheets

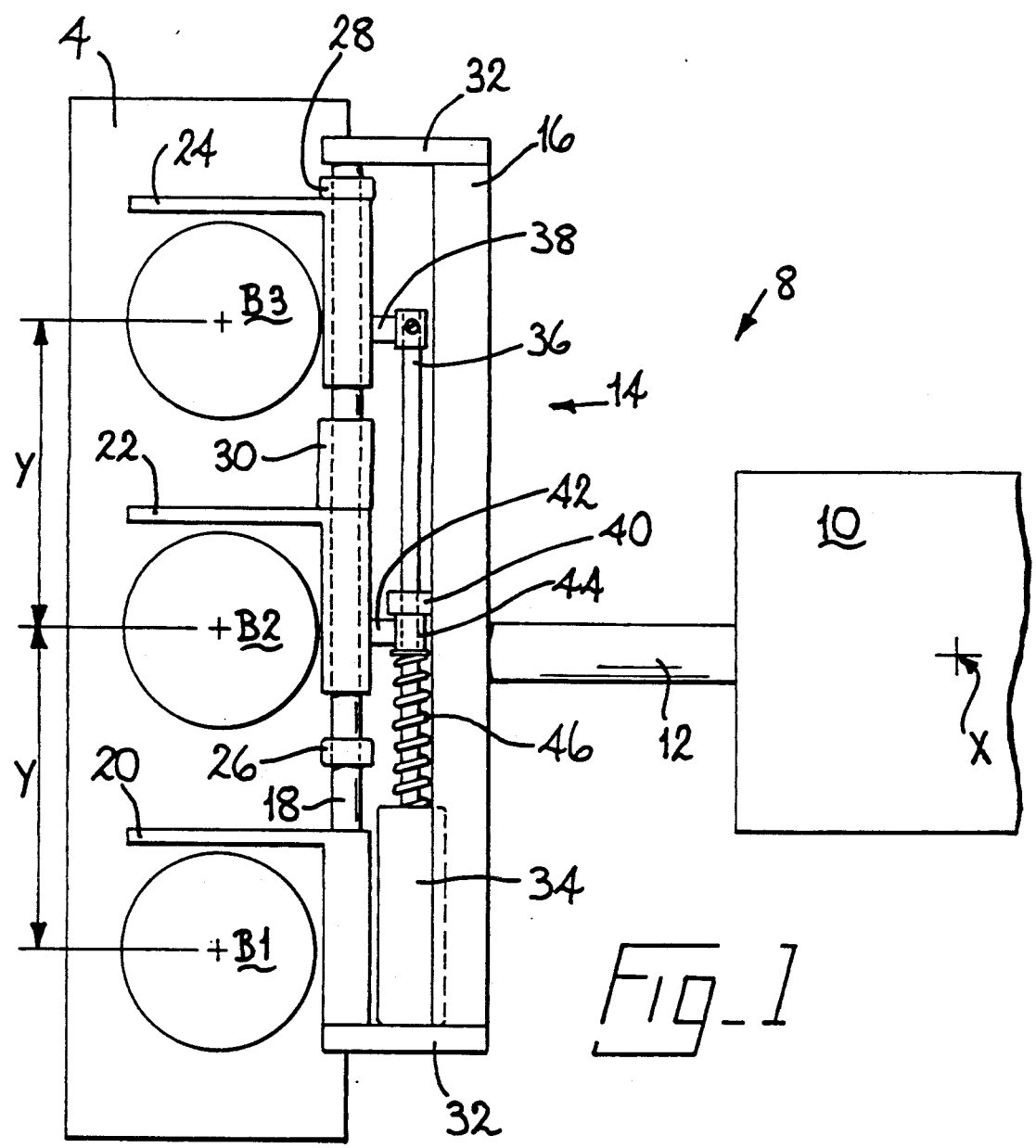
Fig_1

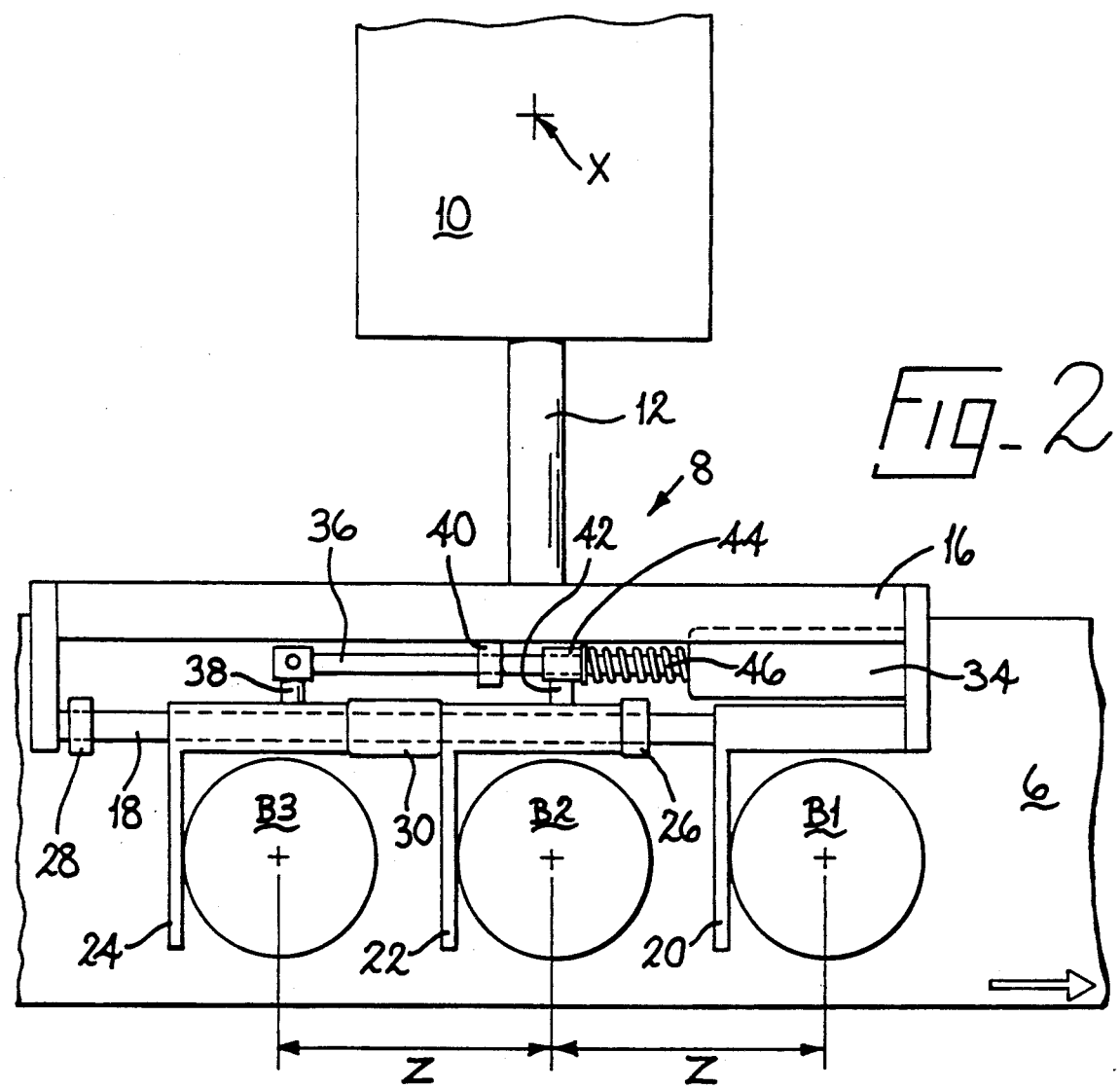
FIG_2

PUSH CUT DEVICE

BACKGROUND OF THE INVENTION

This invention is concerned with improvements in push out devices for use with glassware forming machines.

In a conventional type of glassware forming machine known as an 'I.S. machine', several identical sections, usually eight to ten, but sometimes as many as 16, are mounted side by side and operate, cyclically but in off set timed relationship to make glass containers. Each section normally contains more than one mould for the making of such containers, usually two or three but increasingly commonly four: the machines are consequently described as double-, triple or quadruple- gob machines. In the operation of each section the requisite number of gobs of molten glass are provided to a set of parison moulds, in each of which a parison is formed, and the set of parisons is transferred to a set of blow moulds in which they are blown to the required shape. When the containers have been formed they are removed from the blow moulds by a take out mechanism, which picks up the containers and transfers them, usually to a dead plate on which they are cooled, and from which they are pushed out onto a conveyor by a push out device.

A typical push out device to remove moulded containers from a dead plate of a glassware forming machine a conveyor is shown in U.S. A 4771878 and comprises two pusher fingers which are mounted for a movement between an operative, extended, position and a retracted position by means of a pusher head, provided by a piston and cylinder device, and a rotary motor on which the pusher head is mounted and which is arranged to rotate the pusher head through approximately 90° from an orientation in which it faces the dead plate to an orientation in which it faces the conveyor.

Conventional push out mechanism pushing the moulded articles onto a conveyor from the dead plate may, by appropriate spacing of the pusher fingers, alter the spacing of the moulded articles on the conveyor from that on the dead plate, but the amount by which this can be done is severely restricted by size and spacing of the containers and the need to position the fingers between the containers; the constraint is greater in a three or four gob machine than with a double gob machine. Also if an attempt is made to make a substantial change to the spacing one at least of the pusher fingers will necessarily be moving quite fast when it first contacts the appropriate container, thus risking damaging the container.

With increasing use of multi gob machines and efforts to increase the rate of operation of the glassware forming machines, conveyor speeds also have to increase; it is however desirable to have the conveyor speed as low as possible, partly for economy of operation, but also because with increasing conveyor speeds problems of instability of containers on the conveyor increase. For this reason it is often desirable to obtain a spacing of containers on the conveyor which is less that the spacing on the dead plate.

With certain machines, the widths of a section of the machine is in fact greater than the distance necessary to accommodate the containers removed from the section. In these cases it is sometimes desirable to ensure that the containers are placed on the conveyor with a spacing which is more than the spacing on the dead plate, to ensure that the containers on the conveyor are all equally spaced, thus to provide for uniformity of conditions of the containers on the conveyor and for ease of handing in subsequent operations.

It is one of the objects of the present invention to provide a push out device which enables the spacing of containers on the conveyor to be varied from the spacing of containers on the dead plate.

BRIEF DESCRIPTION OF THE DRAWINGS

In the accompanying drawings;

FIG. 1 shows a preferred embodiment of a push out device with containers on a dead plate of the glassware forming machine;

FIG. 2 shows the push out device with the containers on a conveyor of the glassware forming machine.

DETAILED DESCRIPTION

The push out device is adapted for use with a multi gob glassware forming machine, as shown, with a triple gob machine. The device is arranged to remove moulded containers B1, B2, B3 from a dead plate 4 of the machine to a conveyor 6 by which the containers are carried away from the machine for a further operations—e.g. for annealing, inspection and packing.

The push out device comprises a pusher head 8 which comprises a piston and cylinder arrangement 10 from which extends a piston rod 12 which supports a head frame 14.

The frame 14 comprises a support bar 16, fixed to the rod 12, and a cross bar 18. Three pusher fingers 20, 22, 24 are supported on the cross bar 18: the first finger 20 is fixed to the cross bar 18, while the second and third pusher fingers 22, 24 are slidably mounted on the bar 18. Preferably the bar 18 is of non-circular cross section to maintain the fingers 20,22,24 in appropriate orientation.

Mounted on the cross bar 18 are two adjustable stops 26,28 and a spacer 30. The stops 26 and 28 are fixed to the bar 18, the spacer 30 is slidable on the bar. Secured to one of two side plates 32, 32 extending between the bars 16 and 18 is a pneumatic piston and cylinder device 34 comprising a piston rod 36. A lug 38 on the pusher finger 24 is attached to an end portion of the rod 36: a support 40 through which the rod may freely move is secured to the support bar 16 and a lug 42 secured to the finger 22 supports a sleeve 44 which slides on the piston rod 36. A spring 46 extends between the sleeve 44 and the piston and cylinder device 34.

In the operation of the push out device, the pusher head 8 is in a retracted position (not shown) when moulded containers B removed from the forming machine are positioned on the dead plate 4 by a take out mechanism of the machine, and is in an orientation in which the head 8 faces the dead plate. The pusher head 8 is then extended to bring the pusher fingers 20,22,24 between the containers B in position to push the containers off the dead plate 4. Rotary means (not shown) of the push out device then operates to rotate the pusher head through 90° about the axis from its orientation in which it faces the dead plate into an orientation (FIG. 2) in which it faces the conveyor 6, thus to sweep the containers B off the dead plate onto the conveyor 6. The pusher, head 8 is then moved into its retracted position by operation of the piston and cylinder arrangement 10, thus to clear the containers B to be carried off by the conveyor.

The containers B1, B2, B3 when placed on the dead plate 4 are in the same spacing as that of the moulds of the forming machine, Y in FIG. 1. As the push out device rotates to sweep the containers from the dead plate onto the conveyor the piston and cylinder device 34 is operated to draw in the piston rod 36. This drawing in movement moves the pusher finger 24 on the bar 18 until it contacts the spacer 30, which contacts the pusher finger 22 which is moved until it contacts the stop 26. The containers B3 and B2 in contact with the pusher finger 24 and 22 are thus moved closer to the container B1, to a spacing apart of Z. The containers are thus closer together on the conveyor than on the dead plate when the pusher fingers are withdrawn to release the containers.

On the return of the pusher head into its orientation facing the dead plate the device 34 is operated to move the piston rod 36 outwardly. This returns the pusher finger 24 to its original position determined by the stop 28, while the spring 46 asserts itself to return the finger 22 to its original position determined by abutment of the sleeve 44 against the support 40.

It will be understood that by simple modifications of the above described push out device, it can be arranged that the spacing between the containers is increased as they are swept off the dead plate onto the conveyor.

We claim:

1. A push out device adapted for use with a multigob glassware forming machine to remove moulded containers from a dead plate of the machine to a conveyor comprising
   a pusher head,
   rotary means on which the pusher head is mounted and which is arranged to rotate the pusher head from an orientation in which it faces the dead plate to an orientation in which it faces the conveyor,
   at least two pusher fingers mounted in the pusher head
   means for moving the pusher fingers between an operative, extended, position and a retracted position,
   the pusher fingers being mounted for relative movement in the direction of the line of the containers
   and means for causing such relative movement of the pusher fingers between the lime when the fingers contact containers on the dead plate and the time when the fingers release the containers on the conveyor so that the spacing of the containers on the conveyor is varied from the spacing of the containers on the dead plate.

2. A push out device according to claim 1 in which said means for causing relative movement moves the pusher fingers together between contacting the containers on the dead plate and releasing them on the conveyor so that the spacing of the containers on the conveyor is less than that on the dead plate.

3. A push out device according to claim 1 in which the pusher fingers are mounted on a cross bar, the leading pusher finger being fixed to the cross bar and the other pusher finger(s) being slidably mounted on the cross bar, the means for causing relative movement moving the slidably mounted pusher finger(s) between a wider spacing and a closer spacing.

4. A push out device according to claim 1 characterized in that it comprises a fixed leading pusher finger and two movable pusher fingers.

* * * * *